United States Patent Office 3,598,749
Patented Aug. 10, 1971

3,598,749
PRODUCTION OF EPOXIDE COMPOSITIONS
Chao-Shing Cheng, Williamsville, Francis E. Evans, Hamburg, Herman Stone, Tonawanda, and Harold Kaler, Niagara Falls, N.Y., assignors to Allied Chemical Corporation, New York, N.Y.
No Drawing. Filed May 23, 1969, Ser. No. 827,142
Int. Cl. C08f 45/36; C08g 51/36, 51/74
U.S. Cl. 252—182
15 Claims

ABSTRACT OF THE DISCLOSURE

Disclosed are uncured polyepoxide resin compositions comprising a polyepoxide containing oxirane groups together with a methyl-norbornane-2,3-dicarboxylic anhydride as curing agent, preferably in the presence of an accelerating agent, such as a tertiary amine or an organo metallic compound, and cured polyepoxide resins produced therefrom. Also disclosed is production of novel liquid anhydride compositions comprising a mixture of 1- and 5-methyl - norbornane-2,3-dicarboxylic anhydrides present in a weight ratio no greater than about 3:1, at least about 40 weight percent of said 5-methyl isomers of said mixture being of exo-configuration, by heating an anhydride mixture comprising endo-1- and 5-methyl-5-norbornene 2,3-dicarboxylic anhydrides at an elevated temperature in the presence of hydrogen. The polyepoxide compositions disclosed are substantially less volatile during curing at elevated temperatures, and cured resins produced therefrom exhibit superior mechanical properties and are of lighter color as compared with cured resins produced from polyepoxide compositions derived from known cycloaliphatic anhydride curatives. The liquid novel anhydride compositions disclosed are storage stable for extended periods of time without deposition of solids and change of color, and are stable to changes in temperature below distillation temperatures.

PRODUCTION OF EPOXIDE COMPOSITIONS

In one aspect, the present invention relates to curable epoxy compositions which exhibit low volatility during curing. A further aspect of this invention relates to the production of cured epoxy resin compositions. In still a further aspect, the invention relates to certain novel saturation bicyclic hydrocarbon dicarboxylic anhydrides and to process for the preparation thereof.

Polyepoxides and glycidyl polyethers of polyhydric phenols and polyhydric alcohols, otherwise known and hereafter referred to as "epoxy resins," are condensation products of organic vicinal epoxides with polyhydric phenols and polyhydric alcohols. They may be cured to form strong products of high molecular weight, by reaction with curing agents such as amines and organic acid anhydrides, and are widely employed as structural plastics, adhesives, molding resins, films and the like because of their high strength, resistance to chemicals, and strong adhesion properties.

Curing of epoxy resins containing oxirane groups, i.e. reactive polyepoxides, with cycloaliphatic cyclic anhydrides, such as hexahydrophthalic anhydride or methyl-5-norbornene-2,3-dicarboxylic anhydrides, by application of heat, e.g. temperatures of about 90–280° C., is known in this art. However, at the foregoing temperatures the epoxy resin curing mixtures evaporate to an appreciable extent thereby evolving obnoxious, and often toxic, fumes. Evaporation of these mixtures, evidently, is not limited to evaporation of the polyepoxide and anhydride reactants but also includes vaporization of the anhydride-polyepoxide reaction products and/or thermal decomposition products of the aforementioned reactants and reaction products. In addition to the foregoing disadvantage of high volatility, many heretofore known cycloaliphatic anhydride-polyepoxide compositions, particularly those containing glycidyl ethers of polyhydric compounds as the polyepoxide, cure to epoxy resins of dark unattractive color and/or exhibit relatively poor mechanical properties, and hence, are unacceptable for certain applications.

Although use of dicarboxylic anhydrides of bicyclic hydrocarbons are known for curing of liquid polyepoxy compounds, many of the anhydrides of this class possess undesirable chemical or physical properties which limit their utility in epoxy rein curing applications. For example, the Diels-Alder adduct of methylcyclopentadiene and maleic anhydride is widely employed in curing liquid polyepoxy compositions; this adduct is a mixture of endo-1- and 5-methyl-5-norbornene-2,3-dicarboxylic anhydrides (S. M. Csicsery J. Org. Chem., 25, 518 (1960)), which mixture undergoes on heating both endo-, exo-, as well as structural isomerization to form a mixture of endo- and exo-1-, 5- and 7-methyl-5-norbornene-2,3-dicarboxylic anhydrides (V.A. Mironov et al., Tetrahedron Letters, 47, 5823 (1966); Izv. Akad, Nauk, SSSR Ser. Khim 1966 (2), 239, Chem. Abstr., 64, 17392 (1966); Dokl. Akad. Nauk, 146, 1098 (1962), Chem. Abstr., 58, 6707 (1963); Izv. Akad Nauk, SSSR Ser. Khim 1967 (8) 1697 (1967), Chem. Abstr. 68, 38640 (1968); Dokl. Akad. Nauk, SSSR 174 (4), 852 (1967), Chem. Abstr. 68, 49164 (1968) and Tetrahedron 1963 (19) 1939. The Diels-Alder adduct of methylcyclopentadiene and maleic anhydride, as well as the aforementioned isomers, are volatile materials which evolve toxic vapors of maleic anhydride and methylcyclopentadiene on heating. Moreover, the aforementioned anhydrides are solids at ambient temperature, i.e. at about 25° C. which render their blending with the liquid polyepoxide reactant difficult without application of heat; the necessary heating to effect blending thereof with the polyepoxide reactant shortens resin pot-life, and hence, limits the utility of the resin. Although various methods have been employed to liquefy certain of the cycloaliphatic anhydrides (for example, it has been suggested to liquefy the aforementioned adduct by addition of phosphoric acid, as disclosed by H. Lee and and K. Neville, "Handbook of Epoxy Resins," McGraw-Hill Book Company, 1967, Chapter 12, p. 9) such expedient has been found to be inconvenient and may impair base-catalyzed anhydride-epoxy curing reactions.

Accordingly, one object of the present invention is to provide uncured epoxide resin compositions of low volatility comprising a polyepoxide containing oxirane groups together with saturated bicyclic hydrocarbon dicarboxylic anhydrides.

Another object of the present invention involves production of cured polyepoxide resins of improved mechanical properties and color stability comprising an epoxy resin containing oxirane groups cured with saturated bicyclic hydrocarbon dicarboxylic anhydrides.

A further object of the present invention is to provide novel mixtures of saturated bicyclic hydrocarbon dicarboxylic anhydrides of low volatility which are liquid at ambient temperatures.

A still further object is to provide processes for the preparation of novel mixtures of saturated bicyclic hydrocarbon dicarboxylic anhydrides.

It has now been discovered that novel uncured polyepoxide resin compositions, which compositions are substantially less volatile during curing at elevated temperatures than are comparable compositions prepared from conventionally employed cycloaliphatic anhydride curatives, can be obtained by employing at least one methyl-norbornane-2,3 - dicarboxylic anhydride, i.e. methylbicyclo - [2.2.1] - heptane-2,3-dicarboxylic anhydride, as curing agent for the liquid epoxy resins. Additionally, in accordance with the present invention, it has been found that cured epoxy resins derived from glycidyl polyethers of polyhydric compounds, such as polyhydric phenol, exhibit superior mechanical properties, such as tensile strength and elongation, and are characterized by a lighter coloration as compared with resins cured with known cycloaliphatic anhydrides.

The uncured epoxy resin compositions of the present invention are prepared by simply admixing, preferably with agitation, a liquid polyepoxide with a curing agent comprising at least one methyl-norbornane-2,3 - dicarboxylic acid and/or anhydrides thereof. The cured polyepoxy resins derived therefrom are prepared by heating a homogeneous mixture of said liquid polyepoxide and methyl-norbornane acid or anhydride according to techniques conventionally employed in the art of curing epoxy resins with cycloaliphatic anhydrides. Accordingly, the curable compositions of the invention can be partially cured or fully cured by maintaining the temperature of the polyepoxide composition in the range from about 50° C. and lower, to about 280° C., and higher, and preferably from about 90° C. to about 200° C. One preferable method is to heat the curable compositions to a temperature within the range of between about 90° C. and 200° C. and thereafter post-curing the partially cured and/or cured resin according to conventional techniques by heating to a temperature which is between about 50° C. and 75° C. higher than the curing temperature employed in producing the partially cured and/or cured polyepoxide resin.

The time for effecting the partial cure or the complete cure will be governed by several factors, such as the nature of the polyepoxide and curing agents employed, the proportions of curing agent and polyepoxide of the composition, the inclusion of a catalyst, the concentration of the catalyst, the temperature for effecting the cure, the inclusion of other active organic hardener(s), and other considerations. In general, the time for effecting the complete cure may vary from a few minutes to several hours, e.g. 30 minutes to about 24 hours, depending upon the correlation of such factors, as illustrated above. Preferably, the uncured epoxy resin compositions of the present invention are cured for about one to about 5 hours, and in the event post-curing is employed, for a period of about one to 4 hours.

Although curing of the novel uncured epoxy resin compositions of the present invention may be effected in the absence of catalyst and/or accelerator, it is preferred to employ such activator of the type conventionally employed in curing epoxy-resin/epoxide formulations. Catalysts conventionally employed in curing epoxy resin formulations include tertiary amines, such as benzyldimethylamine, tris(dimethylaminomethyl)phenol, α-methylbenzyldimethylamine, dimethylethylamine, triethylamine, tripropylamine, trimethylammonium hydroxide, and the like; phenol; reaction products of phenol with a tertiary amine or a quaternary ammonium hydroxide; organo metallic compounds, such as tetra-sec-butyltitanate; divalent tin compounds, such as stannous octoate; organo phosphines, e.g. tricyclohexyl phosphine; metal halide Lewis-acids, such as boron trifluoride, aluminum trifluoride, aluminum chloride, zinc chloride, stannic chloride, ferric chloride and complexes of such acids with amines, ethers and the like; as well as chlorine-containing amides and sodium salts of carboxylic acids. Additional catalysts and/or accelerators which may be conventionally employed are found in H. Lee and K. Neville, Op. Cit., Chapter 12, p. 3. In the event a catalyst is employed, the preferred catalyst is a tertiary amine which is desirably charged in an amount of about 0.1 to about 2%, based on the combined weight of polyepoxide and anhydride.

The polyepoxides employable in formulation of the uncured epoxy resin compositions of the present invention are organic compounds or mixtures of organic compounds, the average molecule of which contains more than one 1,2-epoxy group (i.e. oxirane group) in either one or more open-chain structures or one or more cyclic structures. Owing to the methods of preparing the reactive polyepoxide and the fact that such compounds are sometimes present as mixtures of compounds, the number of epoxy groups in an average molecule is not necessarily as whole number, but may be a fraction thereof. However, in all instances, this number of epoxy groups must be greater than one. In general, suitable polyepoxides employable herein have an epoxide equivalency, i.e.

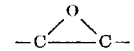

of at least 0.1, preferably between about 0.1 and 2. Illustrative polyepoxide compounds employable include glycidyl polyether of polyhydric phenols, such as 4,4'-dihydroxy-diphenyl-dimethylmethane, glycidyl polyether of polyhydric alcohols, such as 1,4 - butane-diol, glycidyl polyether of polyhydric thiols, such as bis mercapto methylbenzene; basic epoxide compounds, such as the di-N-glycidyl compounds of N,N' - dimethyl-4,4'-diamino-diphenyl-methane; glycidyl esters of di- and polycarboxylic acids, such as phthalic acid diglycidyl ester, N,N'-diepoxypropyloxamide and higher homologues, cyanuric acid-triglycidyl esters and other di- and triepoxides based on s-triazine; epoxidation products of polyunsaturated compounds, such as vegetable oils and their conversion products, epoxidation products of di- and polyolefins, such as butadiene, vinylcyclohexane, 1,5-cyclooctadiene and 1,5,9-cyclododecatriene; unsaturated polymers and copolymers, such as polybutadiene, polyisoprene, butadiene-styrene copolymers, divinylbenzene and dicyclopentadiene; unsaturated polyesters as well as epoxidation products which are obtainable by Diels-Alder addition, e.g. by epoxidation of cyclohexene derivatives and cyclopentene derivatives.

The polyepoxide compounds may also be polymers and copolymers of unsaturated monoepoxides, e.g. glycidylmethacrylate, vinyl- and allyl-epoxystearate, vinylglycide ether, divinyl-benzene-monoepoxide or 3,4-epoxycyclohexane carboxylic acid allyl ester; the polymerization may, if desired, be carried out simultaneously with hardening by the polycarboxylic acid anhydrides according to the invention.

Accordingly, in a preferred embodiment of the present invention, glycidyl polyethers of polyhydric compounds, such as polyhydric phenols and polyhydric alcohols, said glycidyl ethers having an epoxy equivalency of at least 0.1 and a molecular weight above about 200, are employed as the polyepoxide component of the uncured compositions. These polyepoxides are liquids at ambient temperatures and, as such, are more readily handled.

The curing agents employed in the preparation of the present novel uncured epoxy compositions are the cyclic anhydrides of methyl-norbornane-2,3-dicarboxylic acid anhydrides, as indicated above. Representative examples of such anhydrides include endo-2-methyl-norbornane- 2,3-dicarboxylic anhydride; endo- and exo-1, 5- and 7-methyl-norbornane - 2,3 - dicarboxylic anhydrides; mixtures comprising 1- and 5-methyl-norbornane-2,3-dicarboxylic anhydrides which are liquids at or below ambient temperatures, which mixtures constitute another aspect of the present invention; the liquid mixtures of 1- and 5-methyl-norbornane anhydrides are preferred curing agents of the present invention since such mixtures are readily blended with liquid polyepoxy reactants without application of heat.

As is apparent to those skilled in this art, the proportions of polyepoxide, anhydride and catalyst, if any, charged in preparing the epoxy resins of the present invention, will vary widely. Advantageously, about 0.6 to about 1.2, and preferably, about 0.8 to about 1.0 equivalents of anhydride per equivalent of polyepoxide, are employed in preparing the novel uncured polyepoxy resins.

Another aspect of the present invention involves production of novel liquid anhydride compositions comprising mixtures of 1- and 5-methyl-norbornane-2,3-dicarboxylic anhydrides present in a weight ratio no greater than about 3:1, at least about 40 weight percent of said 5-methyl isomers of said mixture being of exo-configuration; these mixtures may include, as well, the isomeric 7-methyl-norbornane - 2,3 - dicarboxylic anhydrides in minor amounts. It was highly surprising to discover that the novel anhydride mixtures of the present invention are liquids at or below ambient temperature (25° C.) since methyl-norbornane anhydride mixtures containing greater weight ratios of 1-:5-methyl isomers and smaller proportions of exo-5-isomers than prescribed above, are solids at ambient temperature. In addition, the liquid anhydride mixtures of the present invention are unexpectedly less volatile than known methyl-5-norbornene anhydrides.

The liquid anhydride mixtures which constitute a further aspect of the present invention are conveniently prepared by hydrogenation of the Diels-Alder adduct of maleic anhydride and methylcyclopentadiene at elevated temperatures, preferably in the presence of a hydrogenation catalyst. Desirably, the adduct is heated prior to hydrogenation to effect endo-exo- and structural isomerization. The discovery that endo-exo- isomerization is effected in preparation of the present novel anhydride mixtures is surprising since isomerization does not occur in the analogous catalytic hydrogenation of endo-2-methyl-5-norbornene-2,3-dicarboxylic anhydride disclosed by J. W. Bolger, U.S. Patent 3,174,979 and R. F. C. Brown et al., Australian J. Chem., 18, 731 (1965), Chem. Abstr., 63, 6882 (1965).

It is essential that the novel liquid anhydride mixtures of the present invention contain 1- and 5-methyl-norbornane-2,3-dicarboxylic anhydrides in a weight ratio of about 3:1 or less, preferably about 2.3:1 or less, anhydride mixtures of the present invention containing the 1- and 5-isomers in a weight ratio between about 1.5:1 and about 0.1:1 or less being especially preferred. The proportions of 5-methyl-norbornane-2,3-dicarboxylic anhydrides in exo-configuration should be greater than about 40 weight percent, and preferably, greater than about 50 weight percent. Especially low melting anhydride mixtures of the invention contain substantially all, i.e. 95% and above, 5-methyl-norbornane-2,3-dicarboxylic anhydrides in exo-configuration. The present liquid anhydride mixtures generally contain minor amounts, i.e. not more than about 5%, based on the weight of the 1- and 5-methyl isomers, of 7-methyl-norbornane-2,3-dicarboxylic anhydride.

As indicated above, the novel anhydride mixtures of the present invention are prepared by heating, for a period of at least .2 hours, an anhydride mixture comprising endo-1- and 5-methyl-5-norbornene-2,3-dicarboxylic anhydrides at an elevated temperature, generally above about 130° C., in the presence of hydrogen. Preferably, the anhydride compositions are prepared by first isomerizing the anhydride mixture comprising endo-1- and 5-methyl-5-norbornene - 2,3 - dicarboxylic anhydrides derived from Diels-Alder condensation of maleic anhydride and methylcyclopentadiene, by heating to a temperature above about 140° C. and especially at about 170–180° C. under substantially anhydrous conditions, desirably in the absence of a solvent or diluent, for a period between about 2 and 15 hours, prior to charging said methylcyclopentadiene-maleic anhydride adduct to the hydrogenation, recovering the isomerized mixture of 1- and 5-methyl-5-norbornene-2,3-dicarboxylic anhydrides by conventional procedures, for example, by distillation and subsequently hydrogenating the isomerized mixture of anhydrides at temperatures above about 130° C. It has been found that isomerization of the adduct at temperatures above about 200° C. results in excessive dissociation of the adducts and its isomerization products into methylcyclopentadiene and maleic anhydride, and hence, is to be avoided; methylcyclopentadiene (or dimer thereof) and maleic anhydride formed by the aforementioned side reaction at prescribed isomerization temperatures, however, can be recovered from the isomerization product by distillation, and recycled to prepare additional Diels-Alder adduct. It has additionally been found that effecting the hydrogenation of the methyl-norbornene- anhydride at temperatures above about 225° C. can result in substantial hydrogenation of one or both anhydride carbonyl groups, as well as excessive dissociation of the feedstock adduct, and hence, ought to be avoided. To suppress thermal dissociation of the methylcyclopentadiene-maleic anhydride adduct, hydrogenation is desirably effected in liquid phase, conveniently in the absence of solvent or diluent, under superatmospheric pressure between about 25 to 200 p.s.i.g. Hydrogenation products of the dissociation products of the feedstock, e.g. methylcyclopentane and succinic acid, which contaminate the desired liquid anhydride product, may be removed by conventional means, for example by fractional distillation. Excessive amounts of succinic anhydride in the liquid anhydride product, i.e. amounts in excess of about 6%, by weight, based on the weight of the anhydride product, promote product solidification on storage and hence, are to be avoided. In any event, it is to be appreciated that the exact conditions of temperature and pressure employed in the hydrogenation will vary depending upon the inclusion of catalyst and on the extent the feedstock may have previously undergone thermal isomerization.

The hydrogenation of the unsaturated methylcyclopentadiene-maleic anhydride adduct is preferably conducted in the presence of a hydrogenation catalyst. Any metal or compound of such metal suitable for accelerating hydrogenation of ethylenic unsaturation in alicyclic compounds may be employed as catalyst. Advantageously, a Group VIII metal of the Periodic Table, such as nickel or palladium, or a compound thereof, is employed as the hydrogenation catalyst. As is conventional in this art, the catalyst may be supported on a finely divided inert substrate, such as activated carbon or silica. The amount of catalyst used is not critical and, in general, may vary from about 0.01 to 5%, by weight, based on the weight of the methylcyclopentadiene-maleic anhydride adduct feedstock.

Since the novel anhydride compositions of the present invention are liquids at or below ambient temperatures, these compositions cure liquid polyepoxy compounds, for example glycidyl ethers of dihydric phenols, to epoxy resins without the necessity of application of heat while mixing polyepoxide and anhydride curing agents. In addition, the novel anhydride compositions of the present invention are of greater thermal stability and are substantially less volatile than the known methyl-5-norbornene anhydride curing agents. Hence, the novel epoxy curing agents of the present invention are less hazardous in most applications than the aforementioned prior art curatives. Furthermore, the novel anhydride compositions are colorless and remain so even on prolonged storage without deposition of solids and are resistant to thermal shock, i.e. resistant to solidification on repeated alternate cooling and warming.

In the following examples which serve to illustrate our invention, parts, percentages and proportions are by weight unless otherwise noted, and temperatures are in degrees centigrade. Clear point is the temperature at which the product melts to a clear liquid.

EXAMPLE 1

Part A

Over a period of about one hour, 2041 parts (11.45 mols) of the solid mixture of endo-1- and 5-methyl-5-norbornene-2,3-dicarboxylic anhydrides which was prepared by Diels-Alder condensation of maleic anhydride, and about a stoichiometric proportion of methylcyclopenpentadiene, obtained by depolymerizing methylcyclopentadiene dimer, is heated with agitation to 175° at atmospheric pressure under dry nitrogen. The liquid mass is maintained at about 175–180° for about 3 hours and then cooled to ambient temperature. About 2033.5 parts of the resultant isomerized mixture of methyl-5-norbornene-2,3-dicarboxylic anhydrides are charged to a still equipped with a fractionation column and distilled (at a still head temperature and pressure of 110° and 5 mm. Hg, respectively, and a still bottom temperature of 143°) to remove about 30.1 parts maleic anhydride, methylcyclopentadiene dimer and unreacted diene and anhydride from the Diels-Alder condensation, as well as dimer and anhydride formed by dissociation of the Diels-Alder adduct during isomerization. The distilland (2003 parts) contains 1- and 5-methyl-5-norbornene-2,3-dicarboxylic anhydrides in a ratio of about 0.22:1, less than 5 percent of 7-methyl isomer, said anhydride isomers being present in about equal proportions of endo- and exo-geometrical configuration (as determined by nuclear magnetic resonance spectral analyses).

Part B

About 1958 parts of the mixture of stripped isomerized methyl-5-norbornene-2,3-dicarboxylic anhydrides of Part A above are charged to an autoclave together with about 1.2 parts palladium on carbon catalyst (containing 5% palladium metal and corresponding to about 0.06%, by weight, of the anhydride mixture). The mass is treated in the liquid phase with hydrogen gas with vigorous agitation at a temperature of 170° and a pressure of 40 p.s.i.g. The hydrogenation is monitored for completion by infrared and nuclear magnetic resonance spectral analyses of samples withdrawn intermittently from the autoclave. The hydrogenation is complete in 6 hours, as evidenced by absence of unsaturated anhydride in the reaction mixture. The hydrogenated mass (1875 parts) is discharged from the autoclave into a chilled receiver.

About 1762.5 parts of the hydrogenated product is charged to a still equipped with a 5 tray Oldershaw fractionation column. The mass is distilled to collect a forecut (217 parts, distilling at a still head temperature and pressure of about 136° and 4.5 to 5 mm. Hg, respectively). This fraction is predominantly succinic anhydride (hydrogenation product of maleic anhydride).

A product fraction (1399 parts) is distilled at a head temperature and pressure of about 115° and 0.5 mm. Hg, respectively, and a still bottom temperature of 195–196°. This fraction is a colorless liquid. The traps attached to the distillation apparatus contain about 48.5 parts of liquid, predominantly methylcyclopentane (the hydrogenation product of methylcyclopentadiene). The product has a clear point below −30° and contains (as determined by nuclear magnetic resonance spectral analyses) 1- and 5-methyl-norbornane-2,3-dicarboxylic anhydrides in a weight ratio of about 1.04:1 (substantially all 5-methyl isomers being of exo-configuration): about 4% succinic anhydride; and less than 5% 7-methyl isomer, on analysis by nuclear magnetic resonance spectra.

The product, a clear colorless liquid, is substantially less volatile than the corresponding isomerized adduct from which it is prepared, and remains a clear colorless liquid even after storage for six months at ambient temperature (about 25°); in contradistinction thereto, under identical storage conditions, the color of the adduct charged as hydrogenation feedstock changes from pale brownish yellow to a bright yellow.

EXAMPLE 2

The procedure of Example 1, above, is repeated except that the hydrogenation feed stock, namely, the adduct of methylcyclopentadiene and maleic anhydride, was stripped of uncombined maleic anhydride and methylcyclopentadiene prior to as well as subsequent to isomerization of the mixture of methyl-5-norbornene-2,3-dicarboxylic anhydrides.

The product, a clear colorless liquid, has a clear point below −30° C. and contains (as determined by nuclear magnetic spectral analyses) 1- and 5-methyl-nonbornane-2,3-dicarboxylic anhydrides in a weight ratio of about 0.96:1 (substantially all 5-methyl isomers being of exo-configuration); about 5% succinic anhydride; and less than 5% 7-methyl isomers, i.e. no detectable 7- methyl isomers on analysis by nuclear magnetic resonance.

EXAMPLE 3

A mixture of stripped isomerized methyl-5-norbornene-2,3-dicarboxylic anhydrides, as obtained by the procedure of Example 1, Part A (except that the adduct of methylcyclopentadiene and maleic anhydride was stripped of uncombined maleic anhydride and methylcyclopentadiene prior to and subsequent to said isomerization step) is charged to an autoclave together with a silica supported nickel catalyst (in an amount of about 3.0%, nickel, by weight of the anhydride mixture starting material). The mass is treated in the liquid phase with hydrogen gas with vigorous agitation at a temperature of about 165° C. and a pressure of 40 p.s.i.g. The hydrogenation is monitored for completion by infrared and nuclear magnetic spectra analysis of samples withdrawn intermittently from the autoclave. The hydrogenation is complete in 8 hours, as evidenced by absence of unsaturated anhydride in the reaction mixture. The desired product is recovered substantially as described in Example 1, Part B, hereinabove.

The product, a clear colorless liquid, has a clear point below −30° and contains (as determined by nuclear magnetic spectral analyses) 1- and 5-methyl-norbornane-2,3-dicarboxylic anhydrides in a weight ratio of about 0.94:1 (substantially all 5-methyl isomers being of exo-configuration); about 1.8% succinic anhydride; and less than 5% 7-methyl isomers, i.e. no detectable 7-methyl isomers on analysis by nuclear magnetic resonance.

EXAMPLE 4

The procedure of Example 2 above is repeated except that in obtaining the 1- and 5-methyl-5-norbornene-2,3-dicarboxylic anhydride starting material, the adduct of methylcyclopentadiene and maleic anhydride was not stripped of uncombined maleic anhydride and methylcyclopentadiene after isomerization.

The mixture of stripped isomerized methyl-5-norbornene-2,3-dicarboxylic anhydrides is charged to the hydrogenation autoclave together with a carbon supported palladium catalyst (in an amount of about 0.05%, by weight, of the anhydride mixture). The mass is treated in the liquid phase with hydrogen gas with vigorous agitation at a temperature of 132° and a pressure of 40 p.s.i.g. for about 10 hours, at which time the hydrogenation was complete, as evidenced by absence of unsaturated anhydride in the reaction mixture. The desired product was recovered substantially as described in Example 1, Part B, hereinabove.

The product, a clear colorless liquid, has a clear point below −30° and contains (as determined by nuclear magnetic spectral analyses) 1- and 5-methyl-norbornane-2,3-dicarboxylic anhydrides in a weight ratio of about 0.35:1, 51% of said 5-methyl isomers being of exo-configuration; less than about 0.5% succinic anhydride; and less than about 5.0% 7-methyl isomers, i.e. no detectable 7-methyl isomers on analysis by nuclear magnetic resonance.

EXAMPLE 5

A solid mixture of endo-1- and 5-methyl-5-norbornene-2,3-dicarboxylic anhydrides which was prepared by Diels-Alder condensation of maleic anhydride, together with about a stoichiometric proportion of methylcyclopentadiene, obtained by depolymerizing methylcyclopentadiene dimer, was charged to a hydrogenation autoclave together with a carbon supported palladium catalyst (corresponding to about 0.31%, by weight, of the anhydride mixture). The mass was treated in liquid phase with hydrogen gas with vigorous agitation at a temperature between about 170–180° at atmospheric pressure for a period of about 4.5 hours, at which time the hydrogenation was complete, as evidenced by absence of unsaturated anhydride in the reaction mixture. The desired product was recovered substantially as described in Example 1, Part B, hereinabove.

The product, a clear colorless liquid, had a clear point of about 14.8° and contained (as determined by nuclear magnetic spectral analyses) 1- and 5-methyl-norbornane-2,3-dicarboxylic anhydrides in a weight ratio of about 3.0:1 (substantially all 5-methyl isomers being of exo-configuration); and less than 5% 7-methyl isomers, i.e. no detectable 7-methyl isomers on analysis by nuclear magnetic resonance.

EXAMPLE 6

The procedure of Example 2 above is repeated except that the adduct of methylcyclopentadiene and maleic anhydride is separated from uncombined maleic anhydride and methylcyclopentadiene by fractional distillation from the isomerization mixture while employing a still head temperature and pressure of 140–160° and 3 to 8 mm. Hg, respectively. The mixture of stripped isomerized methyl-5-norbornene-2,3-dicarboxylic anhydrides is charged to a hydrogenation autoclave together with a carbon supported palladium catalyst (in an amount of about 0.05%, by weight, of the anhydride (mixture). The reaction mass is treated in liquid phase with hydrogen gas with vigorous agitation at a temperature of about 132° at 40 p.s.i.g. for a period of about 5 hours, at which time the hydrogenation was complete, as evidenced by infrared and nuclear magnetic spectral analysis of samples withdrawn intermittently from the autoclave.

The product, a clear colorless liquid, had a clear point of 23.2° and contains (as determined by nuclear magnetic spectral analyses) 1- and 5-methyl-norbornane-2,3-dicarboxylic anhydrides in a weight ratio of about 0.23:1 (48% 5-methyl isomers being of exo-configuration); about 0.25% succinic anhydride; and less than 5% 7-methyl isomers, i.e. no detectable 7-methyl isomers on analysis by nuclear magnetic resonance.

EXAMPLE 7

A portion of the liquid methyl-norbornane-2,3-dicarboxylic anhydride product of Example 2 was cooled to 3° under an atmosphere of nitrogen and held there for about 16 hours. The anhydride product was permitted to stand at ambient temperature (about 25°) for about 7 to 8 hours and then examined for solids. This completed one freeze-thaw cycle. No solids were found and the anhydride product was again cooled to 3° for another freeze-thaw cycle. The liquid anhydride product remained clear and no solids were observed therein even after the product had been subjected to six repetitions, i.e. a total of 7 cycles, of this cycle. This example illustrates the resistance of the liquid anhydride compositions of the present invention to thermal shock.

EXAMPLE 8

At ambient temperature, 300 parts (about 1.58 equivalents) of a liquid glycidyl ether of 4,4'-isopropylidene diphenol (Araldite 6010, Ciba Products Company), 240 parts (1.33 equivalents corresponding to about 80 parts per hundred parts polyepoxide or about 0.84 equivalents per equivalent polyepoxide) of the liquid mixture of 1- and 5-methyl-norbornane-2,3-dicarboxylic anhydrides of Example 1 above, and 4.5 parts of benzyl dimethylamine are agitated for 20 minutes. The resultant liquid mixture is maintained under diminished pressure at ambient temperature for about one hour and then heated for ten minutes at about 90° in an air-circulating oven to remove entrapped air. The liquid mass is charged to molds and heated at 100° for two hours. The resultant cured epoxy resin samples are then heated for four hours at 175° and cooled to ambient temperature.

The following mechanical properties of the cast epoxy resin are determined according to American Society for Testing and Materials (ASTM) procedures: (1) heat deflection temperature (at 264 p.s.i. stress) by ASTM test D648–56 (1965 Book of ASTM Standards, Part 27, pp. 208–211); (2) tensile strength by ASTM test D638–64 (ibid., pp. 184–197); (3) flexural strength; and (4) tangent modulus by ASTM test 790–63 (ibid., pp. 293–299). The results of this example are reported in Table I below.

EXAMPLE 9

The procedure of Example 8 is repeated substantially as described except that 240 parts (1.35 equivalents or 80 parts anhydride per hundred polyepoxide or 0.85 equivalents anhydride per equivalent polyepoxide) of a mixture of isomeric methyl-5-norbornene-2,3-dicarboxylic anhydrides (the hydrogenation feedstock of Example 6) is charged as the anhydride curing agent. The results of this example are compared with those of Example 8 in Table I below.

TABLE I

| Ex. | Heat deflection temp., degrees | Tensile strength, p.s.i. | Percent elongation | Flexural strength, p.s.i. (modulus of rupture) | Tangent modulus, p.s.i. (×10⁻⁵) |
|---|---|---|---|---|---|
| 8 | 143 | 12,100 | 6.6 | 19,000 | 4.0 |
| 9 | 143 | 10,500 | ¹ 4.4 | 19,300 | 4.0 |

¹ Sample broke on testing indicating its relative weakness and/or brittleness on elongation.

EXAMPLE 10

This example illustrates the relative low volatility of the anhydride-polyepoxy composition prepared as in Example 8, during curing at elevated temperature.

In a rotating reaction vessel 24.89 parts of a mixture of 15.3 parts (about 0.081 equivalent) of the glycidyl ether of Example 8 and 12.3 parts (0.068 equivalent, 80.3 parts per hundred parts polyepoxide, corresponding to about 0.85 equivalent per equivalent polyepoxide) of the anhydride curing agent of Example 8, is blown for 2 hours with nitrogen (1000 parts by volume per minute measured at ambient temperature and pressure) at 153°. The resultant liquid partially-cured product is cooled to ambient temperature. The weight of the product is then compared with the original weight of the charge to determine the amount of the reaction mixture which evaporated. The results of this example are tabulated in Table II below.

EXAMPLES 11–14

In comparative Examples 11–14, reported in Table II below, the procedure of Example 10 is repeated at temperatures in the range 150–153° with the variations in the charge as noted in the table. The results of these experiments are compared with those of Example 10.

TABLE II

| Example | Charge | Temp., degrees | Weight loss in charge on heating, parts | Volatility: percent charge evaporated |
|---|---|---|---|---|
| 10 | 24.89 parts of a mixture of glycidyl ether of 4,4'-isopropylidene diphenol and mixture of 1- and 5-methyl-norbornane-2,3-dicarboxylic anhydrides of Example 8 (0.85 equivalent anhydride per equivalent polyepoxide). | 153 | 0.5 | 2.01 |
| 11 | 23.64 parts of a mixture of glycidyl ether of 4,4'-isopropylidene diphenol of Example 8 and mixture of isomeric methyl-5-norbornene-2,3-dicarboxylic anhydrides of Example 9 (0.85 equivalent anhydride per equivalent of polyepoxide). | 153 | 0.79 | 5.34 |
| 12 | 25.78 parts (0.14 equivalent) of glycidyl ether of 4,4'-isopropylidene diphenol of Example 8. | 152 | 0.07 | 0.27 |
| 13 | 25.45 parts (0.14 equivalent) of glycidyl ether of 4,4'-isopropylidene diphenol of Example 8. | 151 | 0.73 | 2.86 |
| 14 | 24.55 parts (0.14 equivalent) of the mixture of isomeric methyl-5-norbornene-2,3-dicarboxylic anhydrides of Example 9. | 151 | 1.46 | 5.95 |

Comparison of the results of Examples 10 and 11 indicates that at the elevated temperatures employed in curing epoxy resins, the epoxy resin curing mixtures of the invention are more than about 40% less volatile than similar reaction mixtures employing a conventional cycloaliphatic cyclic anhydride curing agent.

Evaporation of the reaction mixture in Examples 10 and 11 is evidently not simple co-evaporation of polyepoxy compound and anhydride curing agent. Thus, in simple co-evaporation, the amount of reaction mass evaporated in Example 10 would be expected to be only about 0.36 part (computed from the volatility of the polyepoxide and of the anhydride curative determined in Examples 12 and 13, respectively), rather than 0.50 part as is actually found. Similarly, in Example 11, only about 0.66 part of the reaction mass would be expected to evaporate (as computed from the data of Examples 12 and 14) instead of 1.46 parts as is actually found.

EXAMPLE 15

A mixture of 300 parts (about 1.58 equivalents) of a liquid glycidyl ether of 4,4'-isopropylidene diphenol (Araldite 6010) heated to 50°, 240 parts (about 0.85 equivalent per equivalent polyepoxide) of molten endo-2-methyl-norbornane-2,3-dicarboxylic anhydride and 4.5 parts of benzyl dimethylamine, is agitated for 20 minutes. The resultant mixture is maintained under reduced pressure at about 50° for about 0.25 hour and then heated for 10 minutes at about 90° in an air circulating oven to remove entrapped air. The reaction mass is cured at 100° for 2 hours, post-cured at 175° for 4 hours and then permitted to cool to room temperature. There is obtained, as product, a light colored epoxy resin exhibiting excellent mechanical properties.

EXAMPLE 16

This example illustrates the preparation of a cured cycloaliphatic epoxy resin according to the invention.

The procedure of Example 8 is followed in preparing a cured epoxy resin from 200 parts (1.43 equivalents) of 3,4 - epoxycyclohexylmethyl - 3,4 - epoxycyclohexane carboxylate (Araldite CY 179, Ciba Products Company) and 232 parts (1.29 equivalents; corresponding to 1.16 parts per part polyepoxide or 0.9 equivalent per equivalent of polyepoxide) employing 24 parts of an organo-metallic epoxy resin curing catalyst (Accelerator 065, Ciba Products Company). The mixture is cured at 100° for three hours, post-cured at 150° for four hours and then permitted to cool to room temperature. There is obtained a light colored epoxy resin exhibiting excellent mechanical properties.

EXAMPLES 17–19

In Examples 17–19, cured epoxy resins are prepared in accordance with the procedures noted in Table III below employing about 0.9 to 1.0 equivalent of cycloaliphatic anhydride curative per equivalent polyepoxide. Examples 18 and 19 are comparative examples employing anhydride curing agents other than those of the present invention. In Table III, the colors of these resins are compared with the color of the resin of Example 16.

TABLE III

| Example | Polyepoxide | Anhydride curing agent | Preparative procedure | Color of resin |
|---|---|---|---|---|
| 16 | 3,4-epoxycyclohexyl methyl-3,4-epoxy-cyclohexane carboxylate. | As in Example 8 (0.9 equivalent per equivalent polyepoxide). | As in Example 8 except resin cured at 100° for 3 hours; post-cured at 150° for 4 hours. | Yellow. |
| 17 | 4,4'-isopropylidene diphenol of Example 8. | As in Example 8 (0.95 equivalent per equivalent polyepoxide). | As in Example 8. | Do. |
| 18 | do | As in Example 9 (0.96 equivalent per equivalent polyepoxide). | do | Amber. |
| 19 | do | Cyclohexane-1,2-dicarboxylic anhydride (hexahydrophthalic anhydride; 0.99 equivalent per equivalent polyepoxide). | As in Example 8 except resin cured at 90° for 3 hours; post-cured at 150° for 4 hours. | Do. |

The foregoing comparisons illustrate that more desirable lighter colored cured resins are obtainable from the anhydride curatives of the present invention as compared with similar resins cured with conventional cycloaliphatic cyclic anhydrides, even when the latter resins are cured and post-cured at substantially lower temperatures as in Example 19.

Wherein the above specification discusses endo and exo configurations of methyl norbornene and methyl norbornane dicarboxylic anhydrides, this terminology is intended to indicate the relative configuration of the bridge methylene group with respect to the dicarboxylic anhydride group (see Organic Reactions, John Wiley and Sons, Inc., vol. 4, 1948, pp. 10–12).

We claim:

1. A composition of matter which is a liquid at ambient temperatures consisting essentially of a mixture of 1- and 5-methylnorbornane-2,3-dicarboxylic anhydrides present in a weight ratio no greater than about 3:1, at least about 40 weight percent of said 5-methyl isomers of said mixture being of exoconfiguration.

2. The composition of claim 1 wherein said mixture of 1- and 5-methyl-norbornane-2,3-dicarboxylic anhydrides is present in a weight ratio no greater than about 1.5:1, at least about 50 weight percent of said 5-methyl isomers of said mixture being of exo-configuration.

3. The composition of claim 2 wherein said mixture of 1- and 5-methyl-norbornane-2,3-dicarboxylic anhydrides additionally contains not more than about 5 percent by weight, based on the weight of said 1- and 5-methyl isomers, of 7-methyl-norbornane-2,3-dicarboxylic anhydrides.

4. The anhydride composition of claim 3 wherein substantially all of the 5-methyl-norbornane-2,3-dicarboxylic anhydride of said mixture is of exo-configuration.

5. A process for preparing the composition of claim 1 which comprises heating an anhydride mixture comprising endo-1- and 5-methyl-5-norbornene-2,3-dicarboxylic anhydrides at a temperature above about 130° C. in the presence of hydrogen.

6. The process of claim 5 wherein said anhydride mixture of endo-1- and 5-methyl-5-norbornene-2,3-dicarboxylic anhydrides is derived by Diels-Alder condensation of maleic anhydride with methylcyclopentadiene.

7. The process of claim 5 wherein said heating is conducted in the presence of a catalytic amount of a hydrogenation catalyst in the absence of a diluent.

8. The process of claim 7 wherein said heating is conducted at a temperature between about 170° C. and 200° C. for at least about 2 hours.

9. The process of claim 8 wherein said hydrogenation catalyst is a Group VIII metal of the Periodic Table, or a compound thereof.

10. The process of claim 7 wherein, prior to effecting said heating in the presence of hydrogen, said mixture of endo-1- and 5-methyl-5-norbornene-2,3-dicarboxylic anhydrides is isomerized by heating to a temperature between about 140° C. and about 200° C. in the liquid phase.

11. The process of claim 10 wherein said heating in the presence of hydrogen is conducted at a temperature between about 170° C. and about 200° C. for at least about 2 hours.

12. A process for preparing the composition of claim 1 which comprises:
  (1) isomerizing an anhydride mixture comprising endo-1- and 5-methyl-5-norbornene-2,3-dicarboxylic anhydrides, said anhydride mixture being derived by Diels-Alder condensation of maleic anhydride and methylcyclopentadiene, by heating to a temperature between about 170° C. and about 200° C. in the absence of a solvent under substantially anhydrous conditions for at least about 2 hours thereby forming an isomerized mixture of methyl-5-norbornene-2,3-dicarboxylic anhydrides;
  (2) distilling the isomerized mixture of step (1) to recover as distilland a mixture of endo- and exo-1- and 5-methyl-5-norbornene-2,3-dicarboxylic anhydrides; and
  (3) hydrogenating the mixture of anhydrides of step (2) at a temperature between about 170° C. and about 200° C. for at least about 2 hours in the absence of a diluent and in the presence of a catalytic amount of a hydrogenation catalyst.

13. The process of claim 12 wherein said hydrogenation catalyst is a Group VIII metal of the Periodic Table, or a compound thereof.

14. The process of claim 13 wherein said metal is palladium.

15. The process of claim 13 wherein said metal is nickel.

References Cited
UNITED STATES PATENTS

| | | | |
|---|---|---|---|
| 3,105,839 | 10/1963 | Renner | 260—346.3 |
| 3,194,816 | 7/1965 | Volkenburgh | 260—346.3 |
| 3,203,983 | 8/1965 | Poos | 260—346.3 |

RICHARD D. LOVERING, Primary Examiner

I. GLUCK, Assistant Examiner

U.S. Cl. X.R.

260—47, 78.4, 346.3